Figure 1:
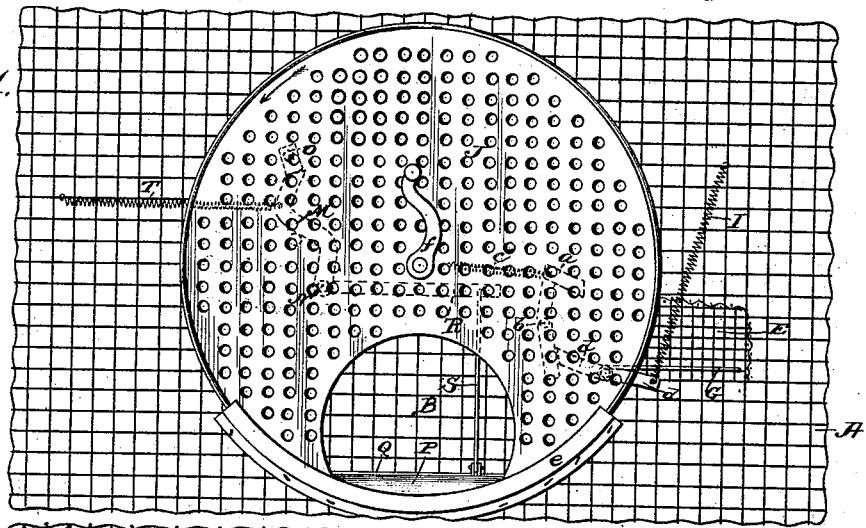

(Model.)

H. BARRY.
ANIMAL TRAP.

No. 407,887. Patented July 30, 1889.

Witnesses.
Wm Rheem
H. C. Groshundts.

Inventor.
Henry Barry
By Jno. G. Elliott
atty.

UNITED STATES PATENT OFFICE.

HENRY BARRY, OF CHICAGO, ILLINOIS, ASSIGNOR OF TWO-THIRDS, BY DIRECT AND MESNE ASSIGNMENTS, TO DENNIS NORTON AND CHARLES FRANKE, BOTH OF SAME PLACE.

ANIMAL-TRAP.

SPECIFICATION forming part of Letters Patent No. 407,887, dated July 30, 1889.

Application filed October 1, 1888. Serial No. 286,909. (Model.)

*To all whom it may concern:*

Be it known that I, HENRY BARRY, a citizen of the United States, residing in the city of Chicago, county of Cook, and State of Illinois, have invented certain new and useful Improvements in Animal-Traps, of which the following is a specification.

This invention relates to improvements in animal-traps in which the doors of the trap are automatically reset, so that a number of animals may be caught in the same trap one after the other without danger of the caged animals escaping when the trap is reset, but is more particularly designed as an improvement upon the invention set forth in my application for Letters Patent of the United States filed on or about September 20, A. D. 1888, Serial No. 286,029, in which are included the generic claims covering this construction, as well as that shown in the said application, and, in fact, any other in which the trap is provided with a single entrance and a door therefor controlled by mechanism the operation of which by the animal will cause the door to close and reopen.

The prime object of this invention is to provide a trap having a single entrance with a spring-actuated revolving door therefor controlled by stops and trips so located that the animal on his entrance to the cage will automatically close the door and automatically reopen it on its passage into the body of the cage.

Another object is to have a spring-actuated revolving door for the entrance to the trap provided with one or more openings adapted and arranged to register with the entrance when the door is revolved, and blind portions between the openings arranged to close the entrance to the trap, the said door to be controlled by stops and trips so located that the openings and blind portions of the door will come successively before the entrance, and thus alternately open and close the entrance to the trap.

A further object is to materially simplify the construction and operation of the trap by dispensing with a number of parts heretofore employed, and thereby promote its effectiveness and at the same time reduce the cost of manufacture.

A still further object is to simplify the mechanism heretofore employed for retaining the caged animals, and thus not only reduce the cost of manufacture, but have these devices of such a character that the entrance of the animal to the body of the trap is greatly facilitated and the retention of the animal insured before the resetting of the trap.

I attain these objects by the devices illustrated in the accompanying drawings, in which—

Figure 2:
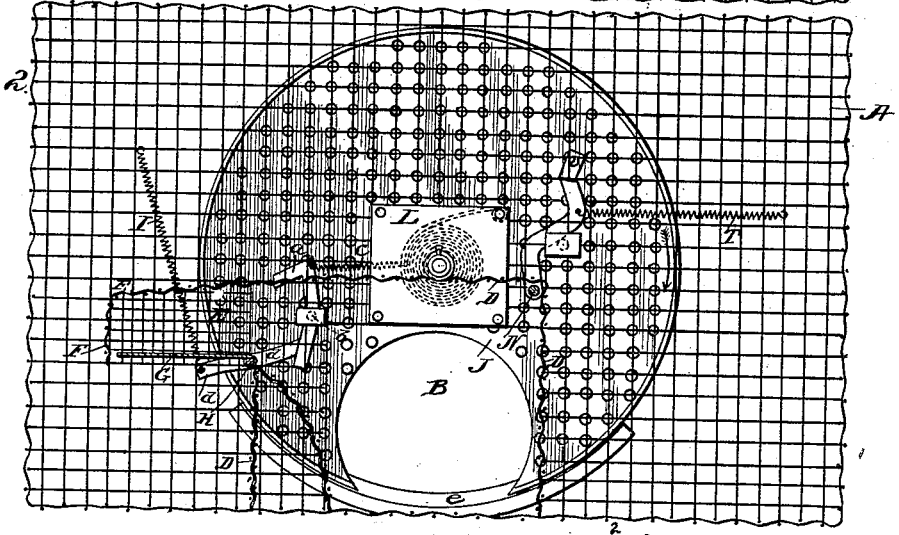
Figure 3:
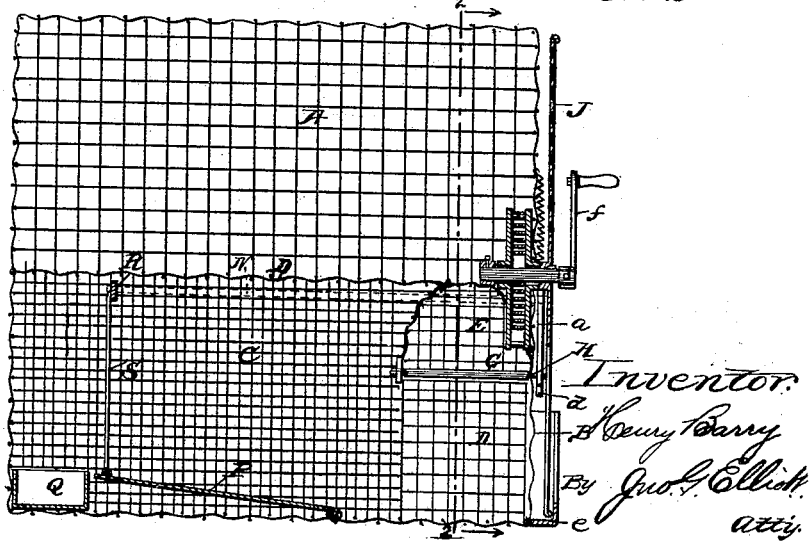

Figure 1 represents a front elevation of a trap embodying my invention; Fig. 2, a transverse vertical section thereof on the line 2 2 of Fig. 3, looking outwardly, as indicated by the arrows in said figure; Fig. 3, a central vertical section.

Similar letters of reference indicate the same parts in the several figures of the drawings.

Referring by letter to the accompanying drawings, A indicates the body or cage of the trap, provided with a single entrance or opening B at one side thereof and a rectangular entrance-way C, extending, preferably, from the entrance to the rear wall of the cage and separated from the body of the cage by wire walls and roof D, which thus leaves the caged animal free to clamber over the entrance-way, so as to be on either side thereof, but still in the main body of the trap. This entrance-way is connected with the body of the trap by a narrow passage E, leading from one side thereof and opening just under the roof, an extension F of which latter, more clearly shown in Fig. 2, constitutes a hood for the passage-way terminating above the floor of the cage. The floor G of the passage, however, is of small size, being merely a trap-door fixed at one side on a rotatable shaft H, journaled in suitable bearings in the walls of the cage and supported in a horizontal position by a spring I of just sufficient strength to support the weight of the door, but which will readily yield to the weight of an animal. When the animal steps upon the door in his efforts to escape from the entrance-way C, the door will yield to his weight and drop him into the body of the cage, from which his escape is prevented by the immediate reclosing of the spring-supported door, with which latter he cannot tamper, because of its location above the floor of the trap and the projection of the edges of the hood below the edge of the door.

The utilization of this trap-door for the purpose of operating the mechanism for resetting the trap will be explained further on, it being only necessary here to remark upon the obvious fact that the trap will not be reset until the animal is completely caged, and there is no danger of his escaping from the then open entrance-way.

For opening and closing the entrance to the trap I employ a revolving disk-like door J, mounted upon a rotatable shaft K, journaled in suitable bearings in the front wall of the trap above the entrance, in which door is cut one or more openings adapted to register with the entrance to the trap whenever the disk is revolved, which latter operation is accomplished by means of a coil-spring L, one end of which is attached to the shaft K and the opposite end to a stationary portion of the cage, so that the uncoiling of the spring produces a rotation of the shaft K, carrying the disk-like door.

The revolving of the door, and consequently the opening and closing of the entrance to the trap, is controlled by means of a trip-arm M, projecting from a shaft N into the path of a stop or projection O upon the inner face of the door. The arm is drawn out of the path of the stop and the door permitted to continue its revolution by means of a trigger or platform P, located in the passage-way of the trap just to the front of the bait-trough Q, which trigger is connected with the shaft N by means of a crank-arm R and a rod S, in such manner that the weight of the animal upon the trigger causes the latter to descend and produce a partial rotation of the shaft, so as to carry the trip-arm out of the path of the stop O, but into which path it is returned by a spring T immediately the animal leaves the trigger-platform. The door continues to revolve until the stop or projection thereon engages another trip $a$, pivoted to the cage at $b$, so as to project into the path of travel of the stop on the door, being so held by means of a spring $c$, attached thereto and to the cage. At this time a blind portion of the door is moved in front of, so as to close the entrance to, the cage, and thus cut off the retreat of the animal in the entrance-way, whose only escape therefrom is through the passage leading to the body of the cage, and, as before explained, as soon as it enters this passage-way it falls through the trap-door, causing the shaft H, upon which the trap is pivoted, to make a partial rotation, and simultaneously therewith an arm $d$ on the outer end thereof strikes against the free end of the trip $a$, thereby causing it to release the stop O and permit the continued rotation of the door until the stop is again engaged by the trip-arm M on the opposite side of the cage, at which time the opening in the door again registers with the entrance to the trap, thus resetting the same ready for the next animal.

The door of the cage is preferably strengthened and guided in the lower portion thereof by a guttered metallic piece $e$, attached to the body of the cage, but which may obviously be dispensed with.

For convenience of winding the spring so as to fix the trap ready for continued operation, I provide a crank-arm $f$ upon the outer end of the shaft K, which, however, may be substituted by a key or any other well-known device for accomplishing the same object.

It is obvious without illustration that any number of openings may be provided in the revolving door with a corresponding number of blind portions intermittent the openings, for alternately opening and closing the entrance to the trap a number of times during a single revolution of the door, it being only necessary to supply one stop for each and every opening in the door.

It is equally obvious that any number of entrances to the same trap might be employed, provided that each entrance be equipped with the revolving door and mechanism for operating the same herein described.

Having described my invention, what I claim, and desire to secure by Letters Patent, is—

1. In an animal-trap, the body thereof provided with a blind entrance-way projecting therein, and a spring-actuated revolving door provided with one or more openings, and a corresponding number of blind portions between said openings, adapted and arranged to alternately register with said entrance, in combination with a passage leading from the entrance-way to the body of the trap, stops for alternately engaging the door, and triggers located in the entrance-way and passage, respectively, for operating said stops, substantially as described.

2. In an animal-trap, the body thereof provided with an entrance, a spring-actuated revolving door having one or more openings, and a corresponding number of blind portions between said openings, and a stop on said door, in combination with trips projecting into the path of said stop, an entrance-way for said body, an elevated passage connecting said entrance-way with the body of the trap, a platform-trigger located in the entrance-way for operating one of said trips, and a spring-supported trap-door in said passage for operating the other trip, substantially as described.

3. In an animal-trap, the body thereof provided with a blind entrance-way projecting therein, a spring-actuated revolving door provided with one or more openings, and a corresponding number of blind portions between said openings, adapted and arranged to alternately register with said entrance, stops upon said door, a shaft journaled on the body of the trap, a spring-controlled trip thereon projecting into the path of said stops, a pivoted platform in said entrance-way, and a rod and crank-arm connection between said platform and shaft, in combination with a passage leading from the entrance-way into the body of the trap, a pivoted trap-door in said passage, and a trip attached to the pivot thereof, also projecting into the path of said stops, substantially as described.

HENRY BARRY.

Witnesses:
A. M. BENNETT,
H. W. PRATT.